US008686871B2

(12) United States Patent
Jensen et al.

(10) Patent No.: US 8,686,871 B2
(45) Date of Patent: Apr. 1, 2014

(54) MONITORING SYSTEM AND METHODS FOR MONITORING MACHINES WITH SAME

(75) Inventors: Raymond Verle Jensen, Gardnerville, NV (US); Charles Terrance Hatch, Gardnerville, NV (US); Boris Leonid Sheikman, Minden, NV (US)

(73) Assignee: General Electric Company, Schenectady, NY (US)

(*) Notice: Subject to any disclaimer, the term of this patent is extended or adjusted under 35 U.S.C. 154(b) by 251 days.

(21) Appl. No.: 13/107,725

(22) Filed: May 13, 2011

(65) Prior Publication Data

US 2012/0286966 A1    Nov. 15, 2012

(51) Int. Cl.
*G08B 3/00*    (2006.01)
*G08B 5/00*    (2006.01)
*G06F 19/00*   (2011.01)

(52) U.S. Cl.
USPC .................. 340/691.1; 340/384.1; 340/407.1; 340/815.4; 235/385

(58) Field of Classification Search
USPC ..................... 340/384.1, 407.1, 691.1, 815.4; 235/385
See application file for complete search history.

(56) References Cited

U.S. PATENT DOCUMENTS

| | | |
|---|---|---|
| 4,642,463 A | 2/1987 | Thoms |
| 4,743,200 A | 5/1988 | Welch et al. |
| 4,755,664 A | 7/1988 | Holmes et al. |
| 4,786,966 A | 11/1988 | Hanson et al. |
| 4,884,137 A | 11/1989 | Hanson et al. |
| 5,045,700 A | 9/1991 | Crowson et al. |
| 5,151,600 A | 9/1992 | Black |
| 5,276,434 A | 1/1994 | Brooks et al. |
| 5,382,986 A | 1/1995 | Black et al. |
| 5,420,828 A | 5/1995 | Geiger |
| 6,016,160 A | 1/2000 | Coombs et al. |
| 6,023,288 A | 2/2000 | Coombs et al. |
| 6,163,309 A | 12/2000 | Weinert |

(Continued)

FOREIGN PATENT DOCUMENTS

| | | |
|---|---|---|
| DE | 10120775 A1 | 10/2002 |
| EP | 1081659 A1 | 3/2001 |
| WO | 2010019871 A1 | 2/2010 |
| WO | 2011054029 A1 | 5/2011 |

OTHER PUBLICATIONS

Search Report and Written Opinion from EP Application No. 12167703.3 dated Sep. 24, 2012.

(Continued)

*Primary Examiner* — Jennifer Mehmood
*Assistant Examiner* — Omar Casillashernandez
(74) *Attorney, Agent, or Firm* — Fletcher Yoder, P.C.

(57) ABSTRACT

A monitoring system for use with a system is provided. The monitoring system includes a data management system that includes a database configured to store data representative of at least one operating characteristic of at least one machine. A portable display assembly is coupled to the data management system and includes at least one sensor configured to detect the presence of the machine within a predefined distance from a portion of the display assembly. The display assembly also includes a communication interface that is coupled to the data management system and is configured to receive the data. Moreover, the display assembly includes a display media that is coupled to the communication interface for presenting an output representative of the data to a user of the display assembly such that the user is enabled to view historical data of the machine and/or monitor the machine in real-time.

14 Claims, 4 Drawing Sheets

(56) References Cited

U.S. PATENT DOCUMENTS

| | | |
|---|---|---|
| 6,255,658 B1 | 7/2001 | Ozil |
| 6,765,569 B2 | 7/2004 | Neumann et al. |
| 6,815,687 B1 | 11/2004 | Branch-Sullivan et al. |
| 6,963,282 B1 | 11/2005 | Yeates et al. |
| 6,995,665 B2 | 2/2006 | Appelt et al. |
| 7,148,484 B2 | 12/2006 | Craig et al. |
| 7,200,463 B2* | 4/2007 | Murray .................. 700/175 |
| 7,263,379 B1 | 8/2007 | Parkulo et al. |
| 7,278,734 B2* | 10/2007 | Jannard et al. ............. 351/158 |
| 7,342,486 B2* | 3/2008 | Tsukada et al. ............. 340/438 |
| 7,362,229 B2* | 4/2008 | Brinton et al. ............. 340/572.1 |
| 7,500,746 B1 | 3/2009 | Howell et al. |
| 7,806,525 B2 | 10/2010 | Howell et al. |
| 7,808,524 B2 | 10/2010 | Park et al. |
| 7,817,104 B2 | 10/2010 | Ryu et al. |
| 7,852,355 B2 | 12/2010 | Friedrich et al. |
| 8,203,458 B2 | 6/2012 | Kaneblei et al. |
| 8,316,850 B2* | 11/2012 | Grilliot et al. ........... 128/205.22 |
| 2002/0031567 A1* | 3/2002 | Magario .................. 425/135 |
| 2002/0191002 A1 | 12/2002 | Friedrich et al. |
| 2003/0061159 A1 | 3/2003 | Adams et al. |
| 2003/0179308 A1 | 9/2003 | Zamorano et al. |
| 2003/0210228 A1 | 11/2003 | Ebersole et al. |
| 2004/0017300 A1 | 1/2004 | Kotzin et al. |
| 2004/0085213 A1 | 5/2004 | Weng |
| 2004/0148088 A1* | 7/2004 | Davis et al. .................. 701/123 |
| 2005/0211777 A1* | 9/2005 | Wetzel et al. ................. 235/385 |
| 2005/0230596 A1 | 10/2005 | Howell et al. |
| 2006/0125623 A1 | 6/2006 | Appelt et al. |
| 2006/0241865 A1 | 10/2006 | Smith |
| 2007/0018807 A1 | 1/2007 | Craig et al. |
| 2007/0069905 A1 | 3/2007 | Wang |
| 2007/0132785 A1 | 6/2007 | Ebersole, Jr. et al. |
| 2008/0146887 A1* | 6/2008 | Rao et al. .................... 600/300 |
| 2009/0147215 A1 | 6/2009 | Howell et al. |
| 2010/0045928 A1 | 2/2010 | Levy |
| 2010/0171758 A1 | 7/2010 | Maassel et al. |
| 2011/0213664 A1 | 9/2011 | Osterhout et al. |

OTHER PUBLICATIONS

EP Search Report and Written Opinion from Application No. 12164878.6 dated Jul. 18, 2012.

Search Report and Written Opinion from EP Application No. 12164879.4 dated Sep. 7, 2012.

* cited by examiner

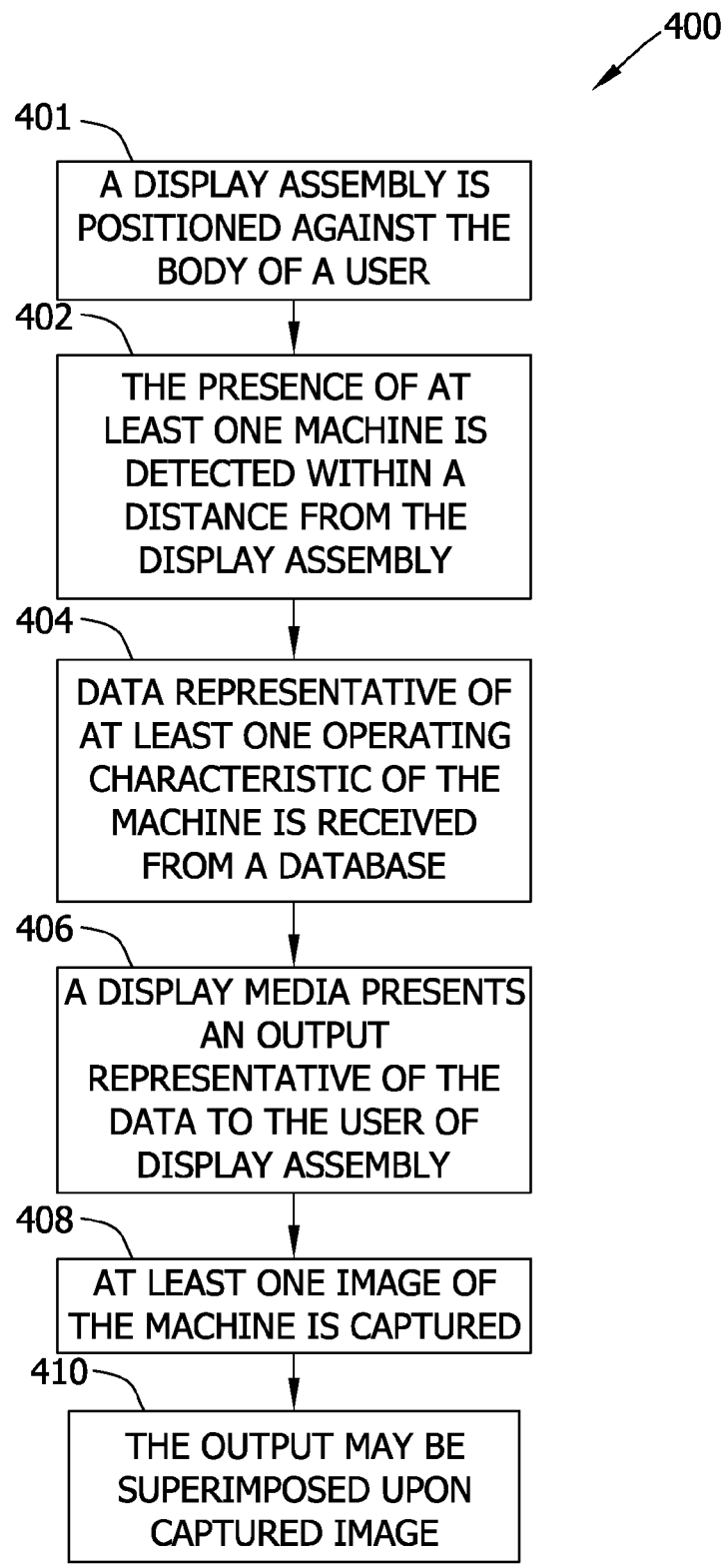

MONITORING SYSTEM AND METHODS FOR MONITORING MACHINES WITH SAME

BACKGROUND OF THE INVENTION

The field of the invention relates generally to monitoring systems and, more particularly, to a monitoring system for use with systems and methods for use in monitoring machines within systems.

During operation of known machines, one or more components may become damaged or worn over time. For example, components, such as bearings and gears, wear over time. Continued operation with a worn or damaged component may cause additional damage to other components and/or may lead to a premature failure of the component.

To detect component damage within machines, the operation of at least some known machines may be monitored with a sensor and/or monitoring system. At least some known sensor systems position at least one sensor assembly in close proximity to the machine and/or component being monitored. Such sensor assemblies may perform, for example, proximity measurements of at least some of the components of the machine and/or the machine itself. However, in some locations, because of the relatively close location of the sensor assembly to the machine and/or component, a user may be unable to readily access data directly from the sensors.

Such sensor systems have a central data base that may be accessible from a computing device, such as a personal computer ("PC"). There is little or no local display of the data at the machines and or sensor assemblies themselves. Even if there is a local display of the data at the machine and/or the sensor assembly, such display generally only includes real-time data and does not display historical data. Such sensor systems require the use of a PC to retrieve any data from each machine and/or sensor assembly.

BRIEF DESCRIPTION OF THE INVENTION

In one embodiment, a monitoring system for use with a system is provided. The monitoring system includes a data management system that includes a database configured to store data representative of at least one operating characteristic of at least one machine. A portable display assembly is coupled to the data management system and includes at least one sensor configured to detect the presence of the machine within a predefined distance from a portion of the display assembly. The display assembly also includes a communication interface that is coupled to the data management system and is configured to receive the data. Moreover, the display assembly includes a display media that is coupled to the communication interface for presenting an output representative of the data to a user of the display assembly such that the user is enabled to view historical data of the machine and/or monitor the machine in real-time.

In another embodiment, a system is provided. The system includes at least one machine and a monitoring system that is coupled to the machine. The monitoring system includes a data management system that includes a database configured to store data representative of at least one operating characteristic of the machine. A portable display assembly is coupled to the data management system and includes at least one sensor configured to detect the presence of the machine within a predefined distance from a portion of the display assembly. The display assembly also includes a communication interface that is coupled to the data management system and is configured to receive the data. Moreover, the display assembly includes a display media that is coupled to the communication interface for presenting an output representative of the data to a user of the display assembly such that the user is enabled to view historical data of the machine and/or monitor the machine in real-time.

In yet another embodiment, a method for use in monitoring machines is provided. The presence of at least one machine from within a predefined distance is detected. Data representative of at least one operating characteristic of the machine is received from a database. Moreover, an output representative of the data is presented, via a display media, to a user of a display assembly such that the user is enabled to view historical data of the machine and/or monitor the machine in real-time.

BRIEF DESCRIPTION OF THE DRAWINGS

FIG. 4 is a flow diagram of an exemplary method that may be used for monitoring machines using the display assembly shown in FIG. 2.

DETAILED DESCRIPTION OF THE INVENTION

The exemplary systems and methods described herein provide a monitoring system that enables a user to monitor a machine and retrieve real-time and historical data for the machine without the use of a personal computer. In particular, the embodiments described herein provide a monitoring system that includes a data management system that includes a database configured to store data representative of at least one operating characteristic of at least one machine. A portable display assembly is coupled to the data management system and includes at least one sensor configured to detect the presence of the machine within a predefined distance from a portion of the display assembly. The display assembly also includes a communication interface that is coupled to the data management system and is configured to receive the data. The display assembly includes a display media that is coupled to the communication interface for presenting an output representative of the data to a user of the display assembly such that the user is enabled to view historical data of the machine and/or monitor the machine in real-time. The user may retrieve data, including historical data, directly from a database, and the use of a personal computer to retrieve the data from the machine may be negated.

Figure 1:
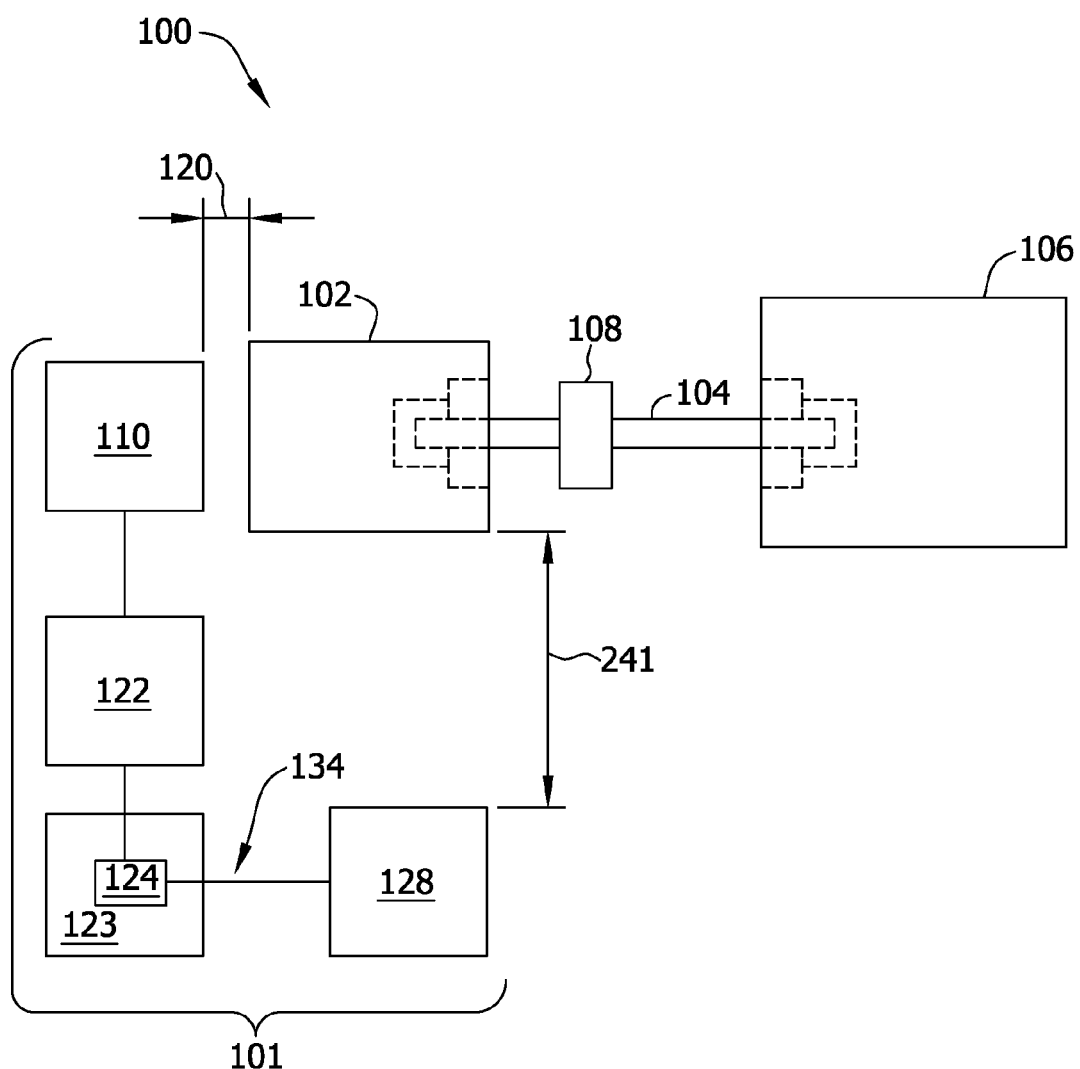
FIG. 1 is a block diagram of an exemplary power generation system.

FIG. 1 illustrates a system 100, such as but not limited to an industrial facility or a power generation system. In the exemplary embodiment, system 100 includes at least one machine 102, such as, but not limited to a wind turbine, a hydroelectric generator, a steam turbine, a gas turbine, and/or a compressor. In the exemplary embodiment, machine 102 rotates a drive shaft 104 coupled to a load 106, such as a generator. It should be noted that, as used herein, the term "couple" is not limited to a direct mechanical, communication, and/or an electrical connection between components, but may also include an indirect mechanical, communication, and/or electrical connection between multiple components. Moreover, while the exemplary embodiment includes a power generation system, the present invention is not limited to power generation systems, and one of ordinary skill in the art will appreciate that the current invention may be used in connection with any system that may contain machines.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or any other structure that enables system 100 to function as described herein.

In the exemplary embodiment, system 100 includes a monitoring system 101 that includes at least one sensor assembly 110 that measures and/or monitors at least one operating condition of machine 102, drive shaft 104, load 106, and/or of any other component that enables system 100 to function as described herein. More specifically, in the exemplary embodiment, sensor assembly 110 is a proximity sensor assembly that is positioned in close proximity to machine 102 for use in measuring and/or monitoring a distance 120 between machine 102 and sensor assembly 110. Moreover, in the exemplary embodiment, sensor assembly 110 uses one or more microwave signals to measure a proximity, such as a static and/or vibration proximity, of machine 102 with respect to sensor assembly 110. Alternatively, sensor assembly 110 may be used to measure and/or monitor any other component of system 100, and/or may be any other sensor or transducer assembly that enables system 100 to function as described herein.

In the exemplary embodiment, sensor assembly 110 is positioned in any relative location within system 100. Moreover, in the exemplary embodiment, a communication module 122 is coupled to sensor assembly 110. Alternatively, communication module 122 may be coupled to machine 102. In the exemplary embodiment, communication module 122 enables sensor assembly 110 to communicate with at least one other component of system 100 and/or monitoring system 101. More specifically, monitoring system 101 also includes a data management system 123 that is coupled to sensor assembly 110 via communication module 122. In the exemplary embodiment, data management system 123 includes a database 124 that stores data therein, such as at least one operating condition of machine 102.

Moreover, in the exemplary embodiment, data management system 123 is coupled to a display assembly 128 via a network 134. Data management system 123 may be any device capable of accessing network 134 including, without limitation, a desktop computer, a laptop computer, or other web-based connectable equipment. In the exemplary embodiment, data management system 123 communicates with display assembly 128 using a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y. Alternatively, data management system 123 may communicate with display assembly 128 using a wired network connection (e.g., Ethernet or an optical fiber). As used herein, the term "microwave" refers to a signal or a component that receives and/or transmits signals having frequencies between about 300 Megahertz (MHz) and to about 300 Gigahertz (GHz).

In the exemplary embodiment, communication module 122 enables sensor assembly 110 to communicate with data management system 123. More specifically, in the exemplary embodiment, communication module 122 enables sensor assembly 110 to transmit data representative of at least one operating characteristic of machine 102 detected by sensor assembly 110 to data management system 123, wherein the data may be stored in database 124. In the exemplary embodiment, the data may include a static and/or a vibration proximity measurement of machine 102 with respect to sensor assembly 110.

Further, in the exemplary embodiment, display assembly 128 enables a user to retrieve the data directly from database 124. More specifically, in the exemplary embodiment, display assembly 128 receives data and presents an output representative of the data to the user such that the user is enabled to view historical data and/or monitor machine 102 in real-time. In the exemplary embodiment, display assembly 128 is positioned against the body of the user such that display assembly 128 is movable with the user. For example, display assembly 128 may be worn by the user or held by the user. Alternatively, display assembly 128 may be positioned in any other location with respect to the user.

During operation, in the exemplary embodiment, because of wear, damage, and/or vibration, for example, components of machine 102, such as drive shaft 104, may change relative positions with respect to sensor assembly 110. For example, vibrations may be induced to the components and/or the components may expand or contract as the operating temperature within system 100 changes. In the exemplary embodiment, sensor assembly 110 measures and/or monitors the proximity, such as the static and/or vibration proximity, and/or the relative position of machine 102 with respect to sensor assembly 110 and transmits data representative of at least one operating characteristic of machine 102 to data management system 123, wherein the data is stored in database 124. The data may be transmitted to display assembly 128, wherein the data is then presented to the user to enable the user to view historical data and/or monitor machine 102 in real-time.

Figure 2:
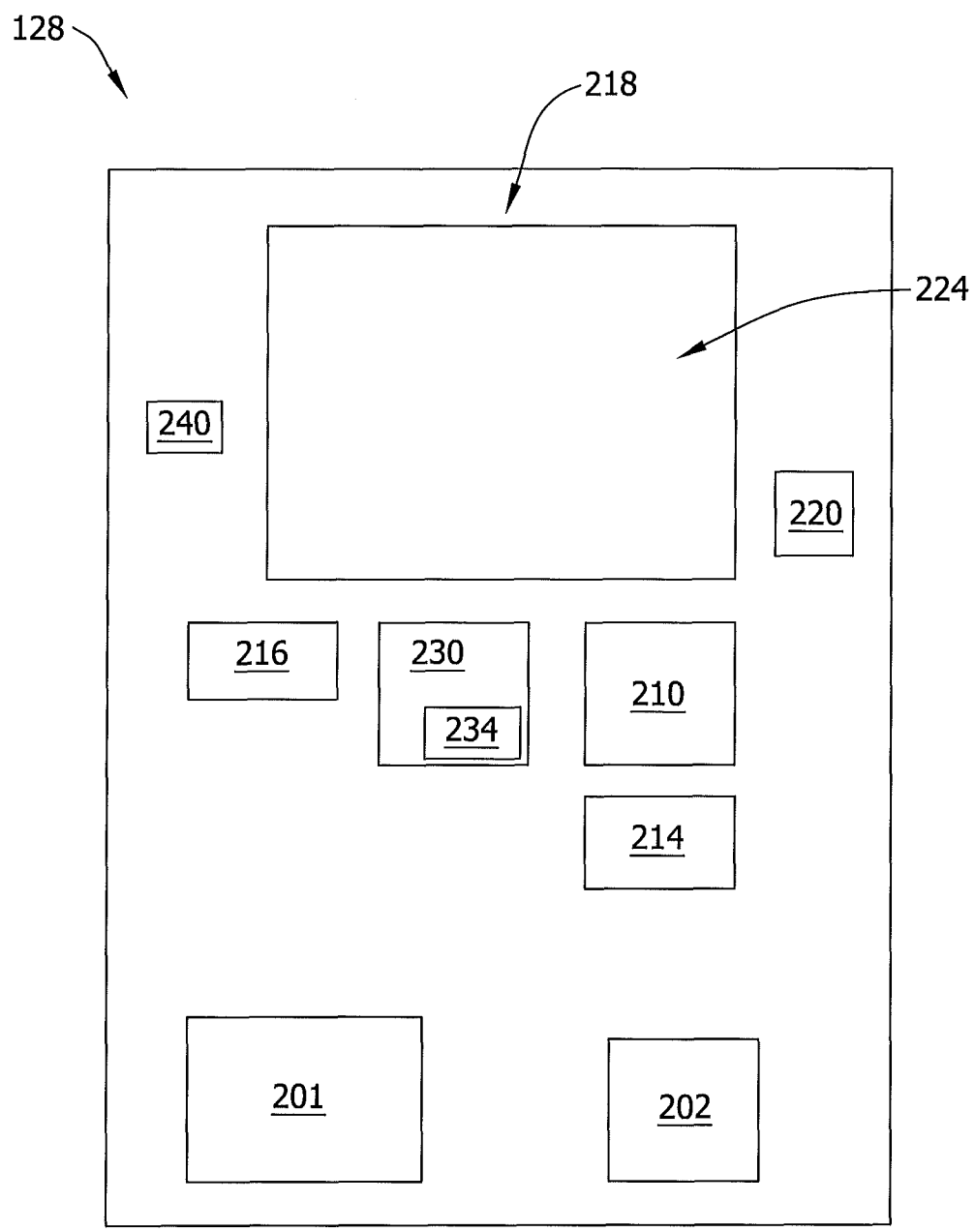
FIG. 2 is a block diagram of an exemplary display assembly that may be used with the power generation system shown in FIG. 1.

FIG. 2 is a block diagram of display assembly 128 that may be used with system 100 (shown in FIG. 1). In the exemplary embodiment, display assembly 128 is held or retained by a user such that display assembly 128 is positioned adjacent to the body of the user and enables display assembly 128 to be movable with the user. More specifically, in the exemplary embodiment, display assembly 128 is a handheld computing device, such as a smart phone. Alternatively, display assembly 128 may be any device that enables display assembly 128 to be positioned adjacent to the body of the user such that display assembly 128 is movable with the user, and that enables display assembly 128, monitoring system 101 (shown in FIG. 1), and/or system 100 to function as described herein.

Moreover, in the exemplary embodiment, display assembly 128 includes a battery 201 that provides power to display assembly 128. In the exemplary embodiment, battery 201 is a rechargeable lithium-ion battery 201. Alternatively, battery 201 may be any other lithium-based battery or any other type of battery that enables display assembly 128 and/or system 100 to function as described herein.

In the exemplary embodiment, display assembly 128 includes a communication interface 202 configured to receive at least one operating characteristic of machine 102 (shown in FIG. 1) from database 124 110 (shown in FIG. 1) within data management system 123 (shown in FIG. 1). More specifically, data management system 123 is coupled to communication interface 202 via network 134 (shown in FIG. 1). In the exemplary embodiment, communication interface 202 is coupled to a short-range wireless communication channel (not shown), such as BLUETOOTH®. BLUETOOTH is a registered trademark of Bluetooth SIG, Inc. of Kirkland, Wash. Alternatively, communication interface 202 may be any other type of communication module that enables display assembly 128, system 101, and/or system 100 to function as described herein.

In the exemplary embodiment, display assembly 128 also includes a processor 210 that is coupled to communication interface 202 via a system bus (not shown). Processor 210 is also coupled to a memory device 214 via the system bus. Moreover, in the exemplary embodiment, data assembly 128 includes an image capturing device 216 is coupled to processor 210 via the system bus and is configured to capture at least one image of machine 102 and/or system 100. In the exemplary embodiment, device 216 is a camera. Alternatively, device 216 may be any other device that is configured to capture at least one image and that enables display assembly 128 and/or system 100 to function as described herein.

In some embodiments, executable instructions are stored in memory device 214. Moreover, display assembly 128 is programmable to perform one or more operations described herein by programming processor 210. For example, processor 210 may be programmed by encoding an operation as one or more executable instructions and providing the executable instructions in memory device 214. Processor 210 may include one or more processing units (e.g., in a multi-core configuration). In the exemplary embodiment, processor 210 is programmed to generate at least one output based on the data that processor 210 receives from database 124. More specifically, in the exemplary embodiment, processor 210 is programmed to generate a graphical and/or a textual representation of the data. Alternatively, processor 210 may be programmed to generate any other output that enables display assembly 128 and/or system 100 to function as described herein.

As used herein, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

Moreover, processor 210 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by processor 210, cause processor 210 to perform at least a portion of the methods described herein. The above examples are exemplary only, and thus are not intended to limit in any way the definition and/or meaning of the term processor.

Memory device 214 enables information such as executable instructions and/or other data to be stored and retrieved. Memory device 214 may include one or more computer readable media, such as, without limitation, dynamic random access memory (DRAM), static random access memory (SRAM), a solid state disk, and/or a hard disk. Memory device 214 may be configured to store, without limitation, executable instructions, configuration data, geographic data (e.g., topography data and/or obstructions), utility network equipment data, and/or any other type of data.

In the exemplary embodiment, memory device 214 stores the data received from database 124 and stores the output generated by processor 210. Moreover, in the exemplary embodiment, memory device 214 stores the image(s) captured by image capturing device 216. Memory device 214 is also configured to store other information related to system 100, such as the number of machines 102 and other components within system 100, and the locations of machines 102 and components within system 100. Moreover, in the exemplary embodiment, memory device 214 may include random access memory (RAM), which can include non-volatile RAM (NVRAM), magnetic RAM (MRAM), ferroelectric RAM (FeRAM) and other forms of memory. Memory device 214 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory device 214. Memory device 214 may also be, or include, a detachable or removable memory, including, but not limited to, a suitable cartridge, disk, CD ROM, DVD or USB memory. Alternatively, memory device 214 may be a database. The term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

A display media 218 and a display adaptor 220 are also coupled to processor 210 via the system bus. In the exemplary embodiment, display media 218 includes a screen 224. Moreover, in the exemplary embodiment, display media 218 presents the output generated by processor 210 to the user via screen 224. More specifically, in the exemplary embodiment, display media 218 includes a visual display, such as a cathode ray tube (CRT), a liquid crystal display (LCD), an organic LED (OLED) display, and/or an "electronic ink" display. As such, in the exemplary embodiment, the user is enabled to see the output on screen 224.

In the exemplary embodiment, display assembly 128 also includes a user interface 230 that is coupled to processor 210 via the system bus. User interface 230 receives any information suitable for use with the methods described herein. More specifically, in the exemplary embodiment, the user can input the output the user would like displayed on display media 218. Moreover, in the exemplary embodiment, user interface 230 includes a keyboard 234. Alternatively, user may include, for example, a pointing device, a mouse, a stylus, a touch pad, a touch screen, a gyroscope, an accelerometer, a position detector.

Display assembly 128 also includes at least one sensor 240 coupled to processor 210 via the system bus. In the exemplary embodiment, sensor 240 is configured to detect the presence of machine 102 within a predefined distance 241 (shown in FIG. 1) from a portion of display assembly 128 such that the user is enabled to identify the location of machine 102 with respect to display assembly 128 and/or the user. In the exemplary embodiment, sensor 240 is at least one of a global positioning system, a tilt sensor, and a compass.

During operation, in the exemplary embodiment, the user holding display assembly 128 moves adjacent to machine 102 and/or specifically, within distance 241. Sensor 240 detects the presence of machine 102 and transmits a signal representative of the detection to communication interface 202. The signal is transmitted to processor 210 and an output is generated and displayed via display media 218. The output enables the user to identify the location of machine 102 with respect to display assembly 128 and/or the user.

Moreover, in the exemplary embodiment, data representative of at least one operating characteristic of machine 102 is transmitted from database 124 to communication interface 202 via network 134. Communication interface 202 transmits the data to processor 210 and to memory device 214 such that the data may be stored. Processor 210 generates at least one output based on the data received. More specifically, processor 210 generates an output that includes a graphical and/or textual representation of the data. Display media 218 then displays the output to the user via screen 224 such that the user is enabled to monitor machine 102. Moreover, the user may retrieve historical data saved in memory device 214 and/or database 124 by requesting historical data via user interface 230. When processor 210 receives such a request, processor 210 generates an output that includes a graphical and/or textual representation of the historical data that processor 210 receives from memory device 214 and/or database 124. The output of the historical data is transmitted to display media 218 for display to the user.

Further, in the exemplary embodiment, the user may capture at least one image of machine 102 via image capturing device 216. The user may be enabled to identify machine 102 based on information related to system 100 stored in memory device, such as the number of machines 102 and other components within system 100, and the locations of machines 102 and other components within system 100. The image may also be presented to the user via display media 218. In the exemplary embodiment, the output representative of the data received from database 124 may be superimposed upon the image.

Figure 3:
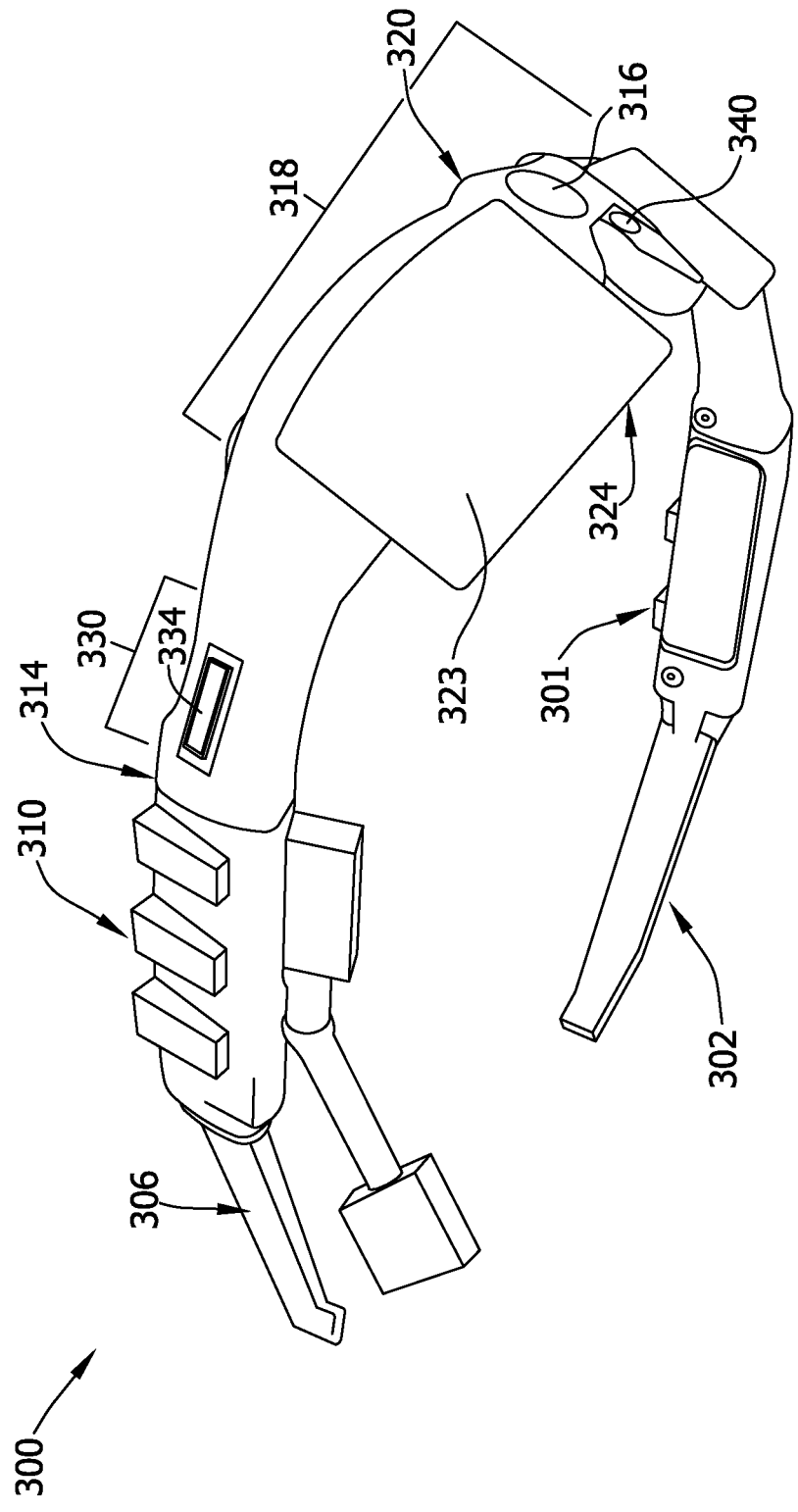
FIG. 3 is a schematic perspective view of an alternative display assembly that may be used with the power generation system shown in FIG. 1.

FIG. 3 illustrates an alternative display assembly 300 that may be used with system 100 (shown in FIG. 1) in place of display assembly 128 (shown in FIGS. 1 and 2). In the exemplary embodiment, display assembly 300 is worn by a user such that display assembly 300 is positioned adjacent to the body of the user and is movable with the user. More specifically, in the exemplary embodiment, display assembly 300 is a pair of eyeglasses worn on the face of the user. Alternatively, display assembly 300 may be any device that enables display assembly 300 to be positioned adjacent to the body of the user such that display assembly 300 is movable with the user, and that enables display assembly 300, monitoring system 101, and system 100 to function as described herein.

Moreover, in the exemplary embodiment, display assembly 300 includes a battery 301 that provides power to display assembly 300. In the exemplary embodiment, battery 301 is a rechargeable lithium-ion battery 301. Alternatively, battery 301 may be any other lithium-based battery or any other type of battery that enables display assembly 300 to function as described herein.

In the exemplary embodiment, display assembly 300 includes a communication interface 302 configured to receive at least one operating characteristic of machine 102 (shown in FIG. 1) from database 124 (shown in FIG. 1) within data management system 123. More specifically, data management system 123 is coupled to communication interface 302 via network 134 (shown in FIG. 1). In the exemplary embodiment, database 124 transmits the data to communication interface 302. Moreover, in the exemplary embodiment, communication interface 302 is a wireless antenna. Alternatively, communication interface 302 may be any other type of communication module that enables display assembly 300 and/or system 100 to function as described herein.

In the exemplary embodiment, display assembly 300 also includes a processor 310 that is coupled to communication interface 302 via a system bus (not shown). Processor 310 is also coupled to a memory device 314 via the system bus. Moreover, in the exemplary embodiment, data assembly 300 includes an image capturing device 316 is coupled to processor 310 via the system bus and is configured to capture at least one image of machine 102 and/or system 100. In the exemplary embodiment, device 316 is an infrared camera. Alternatively, device 316 may be any other device configured to capture at least one image and that enables display assembly 300 and/or system 100 to function as described herein.

In some embodiments, executable instructions are stored in memory device 314. Moreover, display assembly 300 is programmable to perform one or more operations described herein by programming processor 310. For example, processor 310 may be programmed by encoding an operation as one or more executable instructions and providing the executable instructions in memory device 314. Processor 310 may include one or more processing units (e.g., in a multi-core configuration). In the exemplary embodiment, processor 310 is programmed to generate at least one output based on the data that processor 310 receives from database 124. More specifically, in the exemplary embodiment, processor 310 is programmed to generate a graphical and/or textual representation of the data. Alternatively, processor 310 may be programmed to generate any other output that enables display assembly 300 and/or system 100 to function as described herein.

Moreover, processor 310 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by processor 310, cause processor 310 to perform at least a portion of the methods described herein. The above examples are exemplary only, and thus are not intended to limit in any way the definition and/or meaning of the term processor.

Memory device 314 enables information such as executable instructions and/or other data to be stored and retrieved. Memory device 314 may include one or more computer readable media, such as, without limitation, dynamic random access memory (DRAM), static random access memory (SRAM), a solid state disk, and/or a hard disk. Memory device 314 may be configured to store, without limitation, executable instructions, configuration data, geographic data (e.g., topography data and/or obstructions), utility network equipment data, and/or any other type of data.

In the exemplary embodiment, memory device 314 stores the data received from database 124 and stores the output generated by processor 310. Moreover, in the exemplary embodiment, memory device 314 stores the image(s) captured by image capturing device 316. Memory device 314 is also configured to store other information related to system 100, such as the number of machines 102 and other components within system 100, and the various locations of machines 102 and components within system 100. Moreover, in the exemplary embodiment, memory device 314 may include random access memory (RAM), which can include non-volatile RAM (NVRAM), magnetic RAM (MRAM), ferroelectric RAM (FeRAM) and other forms of memory. Memory device 314 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory device 314. Memory device 314 may also be, or include, a detachable or removable memory, including, but not limited to, a suitable cartridge, disk, CD ROM, DVD or USB memory. Alternatively, memory device 314 may be a database. The term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

A display media 318 and a display adaptor 320 are also coupled to processor 310 via the system bus. In the exemplary embodiment, display media 318 includes at least one screen 323 within at least one lens 324. More specifically, in the exemplary embodiment, display media 318 includes two lenses 324, wherein each lens 324 includes one screen 323. In the exemplary embodiment, lenses 324 are polarizing lenses. Alternatively, lenses 324 may be any type of lens that enables display media 318 to function as described herein. Moreover, in the exemplary embodiment, display media 318 presents the output generated by processor 310 to the user via at least one lens 324. More specifically, in the exemplary embodiment, display media 318 includes a visual display, such as a cathode ray tube (CRT), a liquid crystal display (LCD), an organic LED (OLED) display, and/or an "electronic ink" display. As such, in the exemplary embodiment, the user is enabled to see the images on at least one of the lenses 324.

In the exemplary embodiment, display assembly 300 also includes a user interface 330 that is coupled to processor 310 via the system bus. User interface 330 receives any information suitable for use with the methods described herein. More specifically, in the exemplary embodiment, the user can input the output the user would like displayed on display media 318. Further, in the exemplary embodiment, user interface 330 includes a touch sensitive panel 334. Alternatively, user may include, for example, a keyboard, a pointing device, a mouse, a stylus, a touch pad, a touch screen, a gyroscope, an accelerometer, a position detector.

Display assembly 300 also includes at least one sensor 340 coupled to processor 310 via the system bus. In the exemplary embodiment, sensor 340 is configured to detect the presence of machine 102 within a distance 241 (shown in FIG. 1) from display assembly 300 such that the user is enabled to identify the location of machine 102 with respect to display assembly 300 and/or the user. In the exemplary embodiment, sensor 340 is at least one of a global positioning system, a tilt sensor, and a compass.

During operation, in the exemplary embodiment, the user wearing display assembly 300 moves adjacent to machine 102 and/or, more specifically, within predefined distance 241. Sensor 340 detects the presence of machine 102 and sends a signal representative of the detection to communication interface 302. The signal is sent to processor 310 and an output is generated and presented via display media 318 such that the user is enabled to identify the location of machine 102 with respect to a portion of display assembly 300 and/or the user.

Moreover, in the exemplary embodiment, data representative of at least one operating characteristic of machine 102 is transmitted from database 124 to communication interface 302. Communication interface 302 transmits the data to processor 310 and then to memory device 314 such that the data may be stored. Processor 310 generates at least one output based on the data received. More specifically, processor 310 generates an output that includes a graphical and/or textual representation of the data. Display media 318 then presents the output via at least one screen 323 within lens 324 to the user such that the user is enabled to monitor machine 102. Moreover, the user may retrieve historical data saved in memory device 314 and/or database 124 by requesting historical data via user interface 330. When processor 310 receives such a request, processor 310 generates an output that includes a graphical and/or textual representation of the historical data that processor 310 receives from memory device 314 and/or database 124. The output of the historical data is transmitted to display media 318 for display to the user.

Further, in the exemplary embodiment, the user may capture at least one image of machine 102 via image capturing device 316. The user is enabled to identify machine 102 based on information related to system 100 stored in memory device 314, such as the number of machines 102 and other components within system 100, and the locations of machines 102 and components within system 100. The image may also be presented to the user via display media 318. In the exemplary embodiment, the output representative of the data received from sensor assembly 110 may be superimposed upon the image.

FIG. 4 is a flow chart that illustrates an exemplary method 400 to monitor machines using a display assembly, such as display assembly 128 (shown in FIGS. 1 and 2). Display assembly 128 is positioned 401 against the body of a user such that display assembly is movable with the user. The presence of at least one machine 102 (shown in FIG. 1) is detected 402 from within a predefined distance 241 (shown in FIG. 1) from display assembly 128. Method 400 also includes receiving 404 data representative of at least one operating characteristic of machine 102 from a database (shown in FIG. 1). A display media 218 (shown in FIG. 2) presents 406 an output representative of the data to the user of display assembly 128 such that the user is enabled to view historical data and/or monitor machine 102. Moreover, in the exemplary embodiment, at least one image of machine 102 is captured 408 to enable the user to identify machine 102 based on the image. Further, the output may be superimposed 410 upon any captured image.

As compared to known systems and methods that are used for monitoring machines, the above-described embodiments of systems and methods enable a user to directly retrieve information related to at least one operating characteristic of at least one machine without the use of a personal computer. More specifically, the embodiments described herein provide a monitoring system that includes a data management system that includes a database configured to store data representative of at least one operating characteristic of at least one machine. A portable display assembly is coupled to the data management system and includes at least one sensor configured to detect the presence of the machine within a predefined distance from a portion of the display assembly. The display assembly also includes a communication interface that is coupled to the data management system and is configured to receive the data. Moreover, the display assembly includes a display media that is coupled to the communication interface for presenting an output representative of the data to a user of the display assembly such that the user is enabled to view historical data of the machine and/or monitor the machine in real-time. Accordingly, the user is enabled to retrieve the data directly from a database and the use of a personal computer to retrieve the data from the machine may be negated.

A technical effect of the systems and methods described herein includes at least one of (a) detecting the presence of at least one machine from within a predefined distance; (b) receiving data representative of at least one operating characteristic of at least one machine from a database; and (c) presenting via a display media an output representative of data to a user of a display assembly such that the user is enabled to at least one of view historical data of at least one machine and monitor the at least one machine in real-time.

Exemplary embodiments of a system and a method for use in monitoring machines are described above in detail. The system and method are not limited to the specific embodiments described herein, but rather, components of the apparatus and/or steps of the method may be utilized independently and separately from other components and/or steps described herein. For example, the system may also be used in combination with other systems and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for use with a system, the monitoring system comprising:
    a data management system comprising a database configured to store data representative of at least one operating characteristic of at least one machine;
    a portable display assembly coupled to the data management system, the portable display assembly comprising:
        at least one sensor configured to detect the presence of the at least one machine within a predefined distance from a portion of the display assembly;
        a communication interface coupled to the at least one sensor and to the data management system for receiving the data;
        an image capturing device configured to capture at least one image of the at least one machine to enable identification of the machine based on the image; and
        a display media coupled to the communication interface and configured to present to a user an output representative of the data and superimpose the output on the at least one image such that the user is able to view historical data and monitor real-time data of the at least one machine at a machine location.

2. The monitoring system of claim 1, further comprising at least one sensor assembly positioned proximate to the at least one machine and coupled to the data management system, wherein the at least one sensor assembly is configured to detect the at least one operating characteristic of the at least one machine and to transmit the at least one operating characteristic to the database.

3. The monitoring system of claim 1, wherein the at least one sensor comprises at least one of a global positioning system, a compass, and a tilt sensor.

4. The monitoring system of claim 1, wherein the portable display assembly is positioned against the body of the user such that the portable display assembly is movable with the user.

5. The monitoring system of claim 1, wherein the display media comprises at least one of at least one lens and at least one screen.

6. A system comprising: at least one machine; a monitoring system coupled to the at least one machine, wherein the monitoring system comprises: a data management system comprising a database configured to store data representative of at least one operating characteristic of the at least one machine; a portable display assembly coupled to the data management system, the portable display assembly comprising: at least one sensor configured to detect the presence of the at least one machine within a predefined distance from a portion of the portable display assembly; a communication interface coupled to the at least one sensor and to the data management system for receiving the data;
    an image capturing device configured to capture at least one image of the at least one machine; and
    a display media coupled to the communication interface, wherein the display media comprises a lens with a screen, the display media is configured to present an output representative of the data to a user of the portable display assembly such that the user is able to view historical data and monitor real-time data of the at least one machine through the lens;
    wherein the portable display assembly is configured to superimpose the output on the at least one image.

7. The system of claim 6, wherein the monitoring system further comprises at least one sensor assembly positioned proximate to the at least one machine and coupled to the data management system, wherein the at least one sensor assembly is configured to detect the at least one operating characteristic of the at least one machine and to transmit the at least one operating characteristic to the database.

8. The system of claim 6, wherein the portable display assembly is positioned against the body of the user such that the portable display assembly is movable with the user.

9. A method for use in monitoring machines, the method comprising:
  detecting the presence of at least one machine from within a predefined distance;
  capturing at least one image of the at least one machine to enable the at least one machine to be identified based on the at least one image;
  receiving data representative of at least one operating characteristic of the at least one machine from a database;
  presenting via a display media an output representative of the data to a user of a portable display assembly such that the user is able to view historical data and monitor real-time data of the at least one machine; and
  superimposing the output on the at least one image.

10. The method of claim 9, further comprising:
  detecting the at least one operating characteristic of the at least one machine; and
  transmitting the at least one operating characteristic of the at least one machine to the database.

11. The method of claim 9, wherein detecting the presence of at least one machine further comprises detecting the presence of at least one machine using at least one of a global positioning system, a compass, and a tilt sensor.

12. The method of claim 9, further comprising positioning the portable display assembly against the body of the user such that the portable display assembly is movable.

13. The method of claim 9, wherein presenting via a display media further comprises presenting via at least one display screen.

14. The monitoring system of claim 1, wherein the image capturing device comprises an infrared camera.

* * * * *